(12) United States Patent
Watanabe (10) Patent No.: US 10,274,716 B2
(45) Date of Patent: Apr. 30, 2019

(54) IMAGE ACQUISITION APPARATUS, IMAGE ACQUISITION METHOD, AND INFORMATION PROCESSING PROGRAM

(71) Applicant: Sony Corporation, Tokyo (JP)

(72) Inventor: Shinji Watanabe, Tokyo (JP)

(73) Assignee: Sony Corporation, Tokyo (JP)

(*) Notice: Subject to any disclaimer, the term of this patent is extended or adjusted under 35 U.S.C. 154(b) by 257 days.

(21) Appl. No.: 14/151,262

(22) Filed: Jan. 9, 2014

(65) Prior Publication Data
US 2014/0198199 A1  Jul. 17, 2014

(30) Foreign Application Priority Data
Jan. 16, 2013 (JP) ................................. 2013-005264

(51) Int. Cl.
*H04N 9/47* (2006.01)
*G02B 21/36* (2006.01)

(52) U.S. Cl.
CPC .................................. *G02B 21/367* (2013.01)

(58) Field of Classification Search
CPC .................................................. G02B 21/367
USPC .......................................................... 348/79
See application file for complete search history.

(56) References Cited

U.S. PATENT DOCUMENTS

| | | | | |
|---|---|---|---|---|
| 2009/0190812 A1* | 7/2009 | Sano | ...................... | A61B 5/0059 382/128 |
| 2011/0317924 A1* | 12/2011 | Fukushi | ............... | G06K 9/0014 382/199 |
| 2012/0033064 A1* | 2/2012 | Yamada | ............. | G02B 21/0004 348/79 |
| 2012/0293650 A1* | 11/2012 | Murakami | ............. | G02B 21/34 348/135 |

FOREIGN PATENT DOCUMENTS

| JP | 2011-137780 A | 7/2011 |
|---|---|---|
| JP | 2012-8100 A | 1/2012 |

* cited by examiner

*Primary Examiner* — Frederick D Bailey
*Assistant Examiner* — Masum Billah
(74) *Attorney, Agent, or Firm* — Sheridan Ross P.C.

(57) ABSTRACT

An image acquisition apparatus includes: a macro-photographing unit that performs macro-photographing of an image of at least a sample mounting area of a slide, on which a pathological sample is mounted, at a first magnification; a microscopic photographing unit that microscopically photographs a designated photographing area at a second magnification larger than the first magnification; a first judgment unit that judges whether there is an image of the pathological sample in each of a plurality of sectional areas sectioning the image obtained by the macro-photographing; a second judgment unit that judges, as a sample image area, a set of at least one of the plurality of sectional areas judged to be including the image of the pathological sample; and an area expansion unit that generates an expanded area by expanding the sample image area and causes the microscopic photographing unit to photograph the expanded area as the photographing area.

12 Claims, 9 Drawing Sheets

IMAGE ACQUISITION APPARATUS, IMAGE ACQUISITION METHOD, AND INFORMATION PROCESSING PROGRAM

CROSS REFERENCE TO RELATED APPLICATIONS

This application claims the benefit of Japanese Priority Patent Application JP 2013-005264 filed Jan. 16, 2013, the entire contents of which are incorporated herein by reference.

BACKGROUND

The present disclosure relates to an image acquisition apparatus, an image acquisition method, and an information processing program for acquiring an image using a microscope.

From the past, in a digital microscope apparatus, an entire prepared slide (slide) on which a pathological sample is mounted has been photographed using a microscope and converted into a digital image of the slide (see, for example, Japanese Patent Application Laid-open No. 2011-137780 (hereinafter, referred to as Patent Document 1); note that in the technique disclosed in Patent Document 1, a lesion area is searched for at a low magnification, and the magnification is raised stepwise after that like the method for a pathological diagnosis of the related art that uses a microscope).

However, microscopically photographing the entire slide takes time, and a data amount of the photographed image has been enormous.

In this regard, in the digital microscope apparatus, in microscopically photographing a slide, an area to be microscopically photographed has been limited to an area including a pathological sample for reducing time required for the photographing and an image data mount.

For limiting the area, the digital microscope apparatus first performs macro-photographing of the entire slide. Then, based on a thumbnail image as the entire image obtained by the macro-photographing, the digital microscope apparatus sections the thumbnail image into sectional areas as sections obtained by a single microscopic photographing, and judges whether an image of a pathological sample is present for each section.

Then, the digital microscope apparatus microscopically photographs only the sectional area judged to be including an image of the pathological sample. As a result, time required for the photographing and the image data amount are cut.

The most important process out of the procedure described above is the process of judging whether there is an image of the pathological sample in the sectional areas. This judgment is made using a luminance value of pixels in the sectional areas as an index or using an edge component index value obtained by detecting an edge in the sectional areas as an index (see, for example, Japanese Patent Application Laid-open No. 2012-8100).

SUMMARY

However, when a type of the pathological sample is a fat tissue, a tissue subjected to special staining, or a minute sample, even when the judgment described above is performed appropriately, it is understood from calculations that there is a possibility that the sectional area may be judged as not including an image of the sample even though the sectional area includes the pathological sample in actuality.

This is because a macro-camera that photographs the entire slide cannot image fat cells of about several microns. Moreover, it can be easily imagined that a condition of an area that undergoes special staining in blue that has a short wavelength will become prominent. Even when a resolution of macro-photographing is raised, such a condition is not improved prominently.

Specifically, depending on the type of the pathological sample, a detection leakage may occur in the process of detecting an area including an image of the sample for each sectional area, and thus the microscopic photographing may not be carried out appropriately.

In view of the circumstances as described above, there is a need for an image acquisition apparatus, an image acquisition method, and an information processing program with which a microscopic image of a slide can be acquired appropriately.

(1) According to an embodiment of the present disclosure, there is provided an image acquisition apparatus, including: a macro-photographing unit configured to perform macro-photographing of an image of at least a sample mounting area of a slide, on which a pathological sample is mounted, at a first magnification; a microscopic photographing unit configured to microscopically photograph a designated photographing area at a second magnification larger than the first magnification; a first judgment unit configured to judge whether there is an image of the pathological sample in each of a plurality of sectional areas sectioning the image obtained by the macro-photographing; a second judgment unit configured to judge, as a sample image area, a set of at least one of the plurality of sectional areas judged to be including the image of the pathological sample; and an area expansion unit configured to generate an expanded area by expanding the sample image area and cause the microscopic photographing unit to photograph the expanded area as the photographing area.

In the embodiment of the present disclosure, instead of microscopically photographing the sample image area judged by the second judgment unit as it is as the photographing area, the expanded area is generated by expanding the sample image area by the area expansion unit, and the expanded area is microscopically photographed as the photographing area. Therefore, even when there is an image detection leakage in the judgment on whether there is an image of the pathological sample by the first judgment unit, such a detection leakage can be compensated for, and thus a detection leakage ratio can be lowered. As a result, a microscopic image of a slide can be acquired appropriately.

(2) In the image acquisition apparatus according to this embodiment, the area expansion unit may generate the expanded area by expanding the sample image area when a difference between a luminance value of the sample image area and a luminance value of the sectional area judged as not including the image of the pathological sample is smaller than a first threshold value.

In this embodiment, when the difference between the luminance value of the sample image area and the luminance value of the sectional area judged as not including the image of the pathological sample is smaller than the first threshold value, that is, when a contrast of the image of the pathological sample is judged to be low, the area to be microscopically photographed is expanded.

This is because when the contrast of the image of the pathological sample is low, an image detection leakage is apt to occur in the judgment on whether there is an image of the pathological sample by the first judgment unit. By determining a condition for expanding the area and expanding and microscopically photographing the area only when the condition is met, it becomes possible to cut the time required for the microscopic photographing and reduce the image data amount obtained by the microscopic photographing while lowering the detection leakage ratio.

(3) In the image acquisition apparatus according to this embodiment, the area expansion unit may generate the expanded area by expanding the sample image area in an outer circumferential direction in a unit of the sectional areas when the number of sectional areas included in the sample image area is smaller than a predetermined second threshold value, the area expansion unit may generate the expanded area by expanding the sample image area in a rectangular area including the sample image area when the number of sectional areas included in the sample image area is equal to or larger than the predetermined second threshold value, and the rectangular area may have a maximum value of the number of sectional areas included in the sample image area in a longitudinal direction being the number of sectional areas arranged in the longitudinal direction of the rectangular area and a maximum value of the number of sectional areas included in the sample image area in a lateral direction being the number of sectional areas arranged in the lateral direction of the rectangular area.

In this embodiment, it is determined that the sample is a minute sample when the number of sectional areas included in the sample image area is smaller than the predetermined second threshold value and that a tissue fragment of the sample, that has not been detected, highly likely exists in the periphery of the detected sectional area. Then, the sample image area is expanded in the outer circumferential direction thereof in a sectional area unit. As a result, the detection leakage ratio can be reduced.

Moreover, it is determined that the sample is not a minute sample when the number of sectional areas included in the sample image area is equal to or larger than the predetermined second threshold value, and the sample image area is expanded to a rectangular area including the sample image area. As a result, the detection leakage ratio can be reduced.

(4) In the image acquisition apparatus according to this embodiment, the area expansion unit may generate, when there is a sectional area judged as not including the image of the pathological sample in the sample image area, the expanded area by adding the sectional area to the sample image area.

In this embodiment, when there is a sectional area judged as not including the image of the pathological sample in the sample image area, it is judged that an image of the pathological sample that has not been detected highly likely exists in the sectional area, and the sectional area is added to the photographing area for an expansion. As a result, the detection leakage ratio can be reduced.

(5) The image acquisition apparatus according to this embodiment may further include an entire area designation unit configured to cause, when there is no sectional area judged to be including the image of the pathological sample, the microscopic photographing unit to photograph the entire sample mounting area.

In this embodiment, even when there is no sectional area judged as including the image of the pathological sample, the microscopic photographing unit photographs the entire sample mounting area as the photographing area. Accordingly, even when the image of the pathological sample is not detected in the judgment processing by the first judgment unit, an undetected image of the pathological sample can positively be microscopically photographed.

(6) In the image acquisition apparatus according to this embodiment, the first judgment unit may adjust a parameter for judging whether there is the image of the pathological sample and perform the judgment again when the difference between the luminance value of the sample image area and the luminance value of the sectional area judged as not including the image of the pathological sample is smaller than the first threshold value and the number of sectional areas included in the sample image area is smaller than the second threshold value.

In this embodiment, when the contrast of the image of the pathological sample is low and the pathological sample is a minute sample, the parameter for judging whether there is an image of the pathological sample is adjusted so that the judgment on whether there is an image is made again. As a result, the detection leakage ratio can be reduced.

(7) According to another embodiment of the present disclosure, there is provided an image acquisition method including: performing, by a macro-photographing unit, macro-photographing of an image of at least a sample mounting area of a slide, on which a pathological sample is mounted, at a first magnification; judging, by a first judgment unit, whether there is an image of the pathological sample in each of a plurality of sectional areas sectioning the image obtained by the macro-photographing; judging, by a second judgment unit, as a sample image area, a set of at least one of the plurality of sectional areas judged to be including the image of the pathological sample; generating, by an area expansion unit, an expanded area by expanding the sample image area; and microscopically photographing, by a microscopic photographing unit, the generated expanded area at a second magnification larger than the first magnification.

(8) According to another embodiment of the present disclosure, there is provided an information processing program that causes a computer to function as: a first judgment unit configured to judge, for each of a plurality of sectional areas sectioning an image obtained by causing a macro-photographing unit to perform macro-photographing of an image of at least a sample mounting area of a slide, on which a pathological sample is mounted, at a first magnification, whether there is an image of the pathological sample; a second judgment unit configured to judge, as a sample image area, a set of at least one of the plurality of sectional areas judged to be including the image of the pathological sample; and an area expansion unit configured to generate an expanded area by expanding the sample image area and cause the microscopic photographing unit to microscopically photograph the expanded area at a second magnification larger than the first magnification.

As described above, according to the embodiments of the present disclosure, a microscopic image of a slide can be acquired appropriately.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

(General Outline)

The present disclosure is for, as described above, compensating for a detection leakage when detecting an image of a pathological sample in each of sectional areas sectioning a thumbnail image, that is an image obtained by performing macro-photographing on a slide of the pathological sample and lowering a detection leakage ratio.

More specifically, after judging whether there is an image of a pathological sample in each sectional area, a photographing area is variously expanded as will be described below to thus increase sectional areas to be microscopically photographed based on, as a predetermined condition, a contrast of an image and background of a thumbnail image and the number and arrangement of sectional areas judged to be including an image of a pathological sample. As a result, the detection leakage ratio is lowered.

There are 4 types of photographing area expansion methods. It should be noted that in the descriptions below, a set of sectional areas judged to be including an image of a pathological sample will be referred to as sample image area, and an area to be actually microscopically photographed will be referred to as photographing area.

The first expansion involves expanding the sample image area in an outer circumferential direction thereof when the predetermined condition is met (hereinafter, referred to as outer circumferential expansion processing). The second expansion involves expanding the sample image area to a rectangular area including the sample image area when the predetermined condition is met (hereinafter, referred to as rectangular expansion processing). The third expansion involves adding, when there is a sectional area judged as not including an image of a pathological sample inside the sample image area, the sectional area to the photographing area (hereinafter, referred to as closed area processing). The fourth expansion involves setting, when there is no sectional area judged as including an image of a pathological sample, an entire area on which a pathological sample can be mounted as the photographing area (hereinafter, referred to as entire area designation processing).

It should be noted that the judgment on whether a certain sectional area includes an image of a pathological sample uses, as an index, a luminance value of pixels in the sectional area or an edge component index value obtained by detecting an edge of an image in the sectional area as described above. The judgment is made by comparing the indices with a predetermined threshold value.

Therefore, when there is no sectional area judged as including an image of a pathological sample, for example, a sensitivity of the judgment on whether there is an image is raised by lowering the threshold value used for the judgment, and the judgment on whether there is an image is made again after that. Then, the photographing area expansion may be carried out on the sample image area detected by the judgment.

(General Outline of Structure of Digital Microscope Apparatus)

Figure 1:
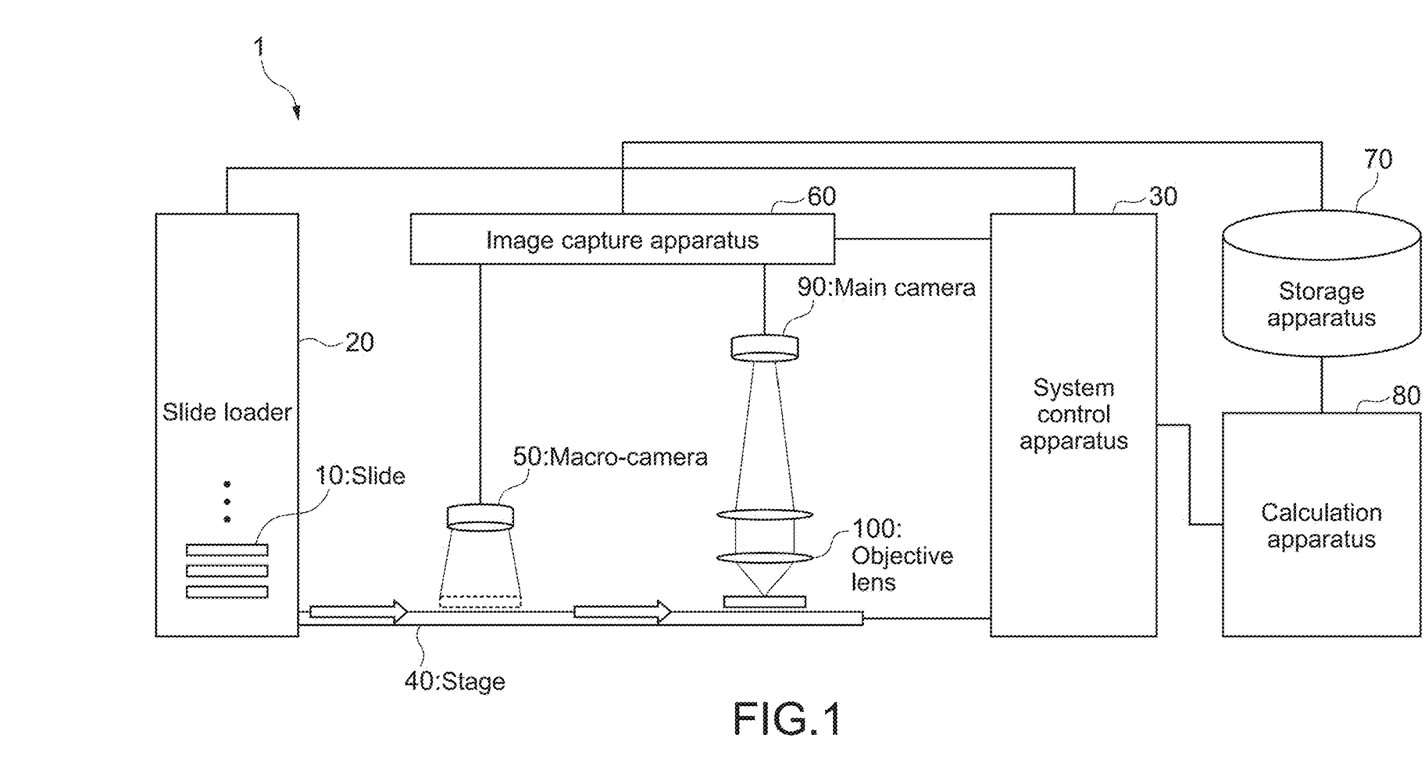
FIG. 1 is a schematic diagram showing a hardware structure of a digital microscope apparatus 1 according to an embodiment of the present disclosure.

Next, an outline of a hardware structure of a digital microscope apparatus according to this embodiment will be described. FIG. 1 is a schematic diagram showing a hardware structure of a digital microscope apparatus 1 of this embodiment.

The digital microscope apparatus 1 includes slides 10, a slide loader 20, a system control apparatus 30, a stage 40, a macro-camera 50, an image capture apparatus 60, a storage apparatus 70, a calculation apparatus 80, a main camera 90, and an objective lens 100.

The slide 10 is a prepared slide in which a pathological sample to be microscopically photographed is mounted on a slide glass. The slide loader 20 stores a plurality of slides 10 and supplies a target slide 10 to the stage 40 in response to an instruction from the system control apparatus 30.

The system control apparatus 30 controls movements of the entire system of the digital microscope apparatus 1 including the slide loader 20, the stage 40, and the image capture apparatus 60. The stage 40 moves the slide 10 supplied from the slide loader 20 to photographing positions of the macro-camera 50 and the main camera 90. The macro-camera 50 performs macro-photographing of the entire slide 10 conveyed from the slide loader 20 by the stage 40 as a thumbnail image in response to an instruction from the image capture apparatus 60.

In response to an instruction from the system control apparatus 30, the image capture apparatus 60 uses the macro-camera 50 and the main camera 90 to photograph the slide 10. The photographed thumbnail image and microscopic image are stored in the storage apparatus 70. The storage apparatus 70 stores the thumbnail image photographed by the macro-camera 50 and the microscopic image photographed by the main camera 90 and supplies the stored images to the calculation apparatus 80 in response to a request from the calculation apparatus 80. The storage apparatus 70 may be incorporated into the calculation apparatus 80.

The calculation apparatus 80 transmits instructions on a photographing order, a photographing method, and the like regarding the slide 10 to the system control apparatus 30 and carries out image processing such as an expansion of a sample image area included in the thumbnail image acquired from the storage apparatus 70 as described above. The calculation apparatus 80 is a generally-used personal computer (PC) or an apparatus conforming to the PC and includes a CPU 81, a memory 82, and a storage unit 83. The CPU 81 executes programs stored in the memory 82, the storage unit 83, and the like to realize functional blocks to be described later.

The main camera 90 microscopically photographs the slide 10 conveyed from the slide loader 20 by the stage 40 at an optical magnification used for a pathological diagnosis. The objective lens 100 enlarges an image to an appropriate magnification when the main camera 90 microscopically photographs the slide 10.

The structure described above is the general outline of the hardware structure of the digital microscope apparatus 1 of this embodiment.

(Flow of Processing in Digital Microscope Apparatus)

Next, referring to FIG. 1, an outline of a flow of photographing of a pathological sample in the digital microscope apparatus 1 will be described.

First, a user sets in the slide loader 20 the slides 10 in each of which a sliced pathological sample is mounted on a slide glass and that have been created using an embedding material and a cover glass.

Next, based on an instruction from the system control apparatus 30, a target slide 10 is taken out from the slide loader 20 and moved to the photographing position of the macro-camera 50 by the stage 40.

Then, based on an instruction from the system control apparatus 30, the image capture apparatus 60 performs macro-photographing of a thumbnail image of the slide 10 using the macro-camera 50. The photographed thumbnail image is stored in the storage apparatus 70 via the image capture apparatus 60.

Subsequently, the calculation apparatus 80 acquires the thumbnail image from the storage apparatus 70, sections the thumbnail image into sectional areas to be used as a basis of a photographing range in a single microscopic photographing, and judges whether an image of a pathological sample is captured in each sectional area. Based on the judgment result, the calculation apparatus 80 calculates a position of the image of the pathological sample captured in the thumbnail image or calculates photographing coordinates for the microscopic photographing by the main camera 90.

More specifically, the calculation apparatus 80 determines sectional areas to be a basis of the area to be microscopically photographed by the main camera 90 at one time on the thumbnail image and judges whether an image of the pathological sample is captured in any of the sectional areas.

It should be noted that while the calculation apparatus 80 carries out the calculation described above, the system control apparatus 30 moves the slide 10 subjected to the macro-photographing to the photographing position of the main camera 90 using the stage 40.

Finally, as soon as the calculation of the photographing coordinates for the microscopic photographing by the calculation apparatus 80 and the movement of the slide 10 to the microscopic photographing position by the stage 40 end, the system control apparatus 30 performs microscopic photographing using the main camera 90. The microscopic photographing is carried out using, as a photographing area, the sectional area judged as including an image of the pathological sample and the sectional area set as a photographing target by the expansion processing.

The image photographed by the microscopic photographing is first stored in the storage apparatus 70 via the image capture apparatus 60 and then processed by the calculation apparatus 80.

The descriptions above have been given on the general outline of the processing for photographing the slide 10 of the pathological sample in the digital microscope apparatus 1.

(Functional Blocks of Calculation Apparatus 80)

Figure 2:
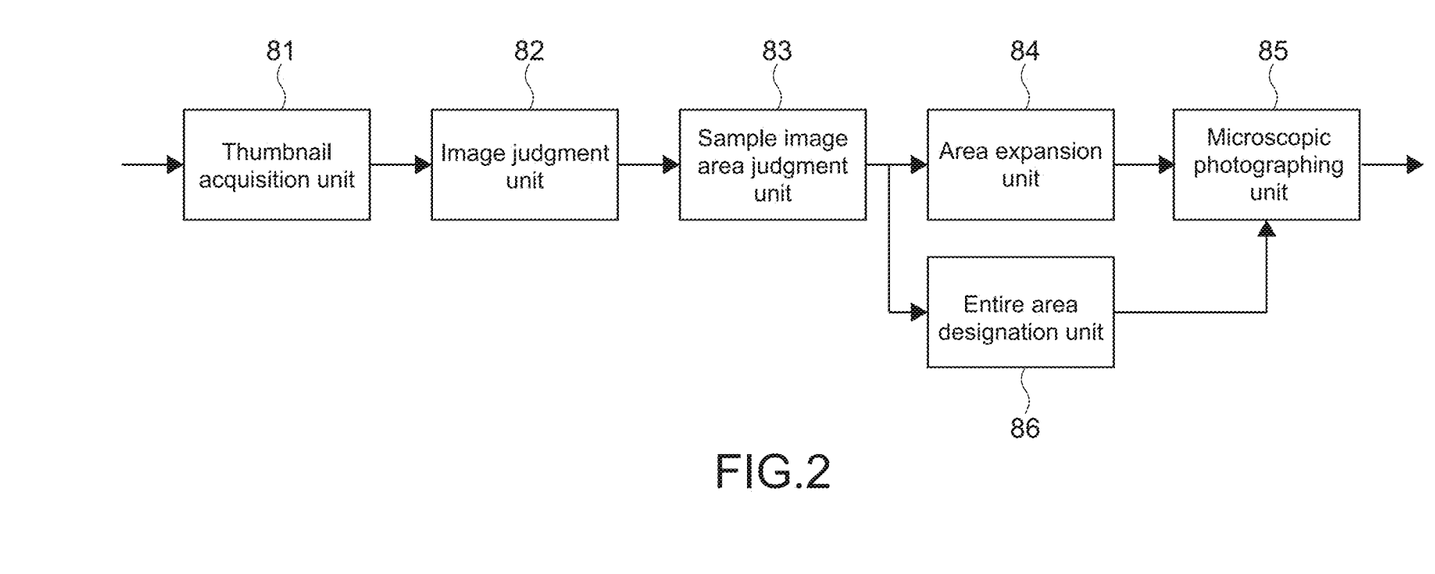
FIG. 2 is a functional block diagram showing functional blocks for realizing processing carried out in a calculation apparatus 80.

Next, an outline of functional blocks for realizing the processing carried out by the calculation apparatus 80 will be described. FIG. 2 is a functional block diagram showing the functional blocks for realizing the processing carried out in the calculation apparatus 80.

The calculation apparatus 80 includes functional blocks of a thumbnail acquisition unit 81, an image judgment unit 82, a sample image area judgment unit 83, an area expansion unit 84, a microscopic photographing unit 85, and an entire area designation unit 86.

The thumbnail acquisition unit 81 transmits an instruction to the macro-camera 50 via the image capture apparatus 60 and performs macro-photographing of the slide 10. The thumbnail acquisition unit 81 also acquires a thumbnail image from the storage apparatus 70. When the acquired thumbnail image is RAW data, the thumbnail acquisition unit 81 may carry out development processing on the thumbnail image.

It should be noted that when an edge component index value obtained by detecting an edge of an image in the sectional areas as indicated in Japanese Patent Application Laid-open No. 2012-8100 (hereinafter, referred to as Patent Document 2) is used as an index in the image judgment unit 82, the thumbnail acquisition unit 81 needs to adjust an illumination used in the macro-photographing so as to suppress an undershoot and overshoot, and thus suppress a luminance value of pixels of the thumbnail image within an edge-detectable range.

The image judgment unit 82 sections the thumbnail image into the sectional areas and judges whether an image of a pathological sample is captured in each of the sectional areas using the luminance value or the edge component index value as an index.

The sample image area judgment unit 83 extracts a set of the sectional areas judged as including an image of the pathological sample as the sample image area. This processing is for shortening a time required for the overall microscopic photographing by limiting the photographing area to be microscopically photographed to the sectional area including an image of the pathological sample.

The area expansion unit 84 carries out the first to third expansion processing, that is, the outer circumferential expansion processing, the rectangular expansion processing, and the closed area processing on the sample image area and obtains the photographing area, the details of which will be given later.

The microscopic photographing unit 85 photographs the photographing area by the main camera 90.

The entire area designation unit 86 designates, when it is judged that there is no sectional area including an image of the pathological sample by the image judgment unit 82, the entire thumbnail image as the photographing area. In other words, the entire area designation processing described above is carried out.

The descriptions above are the outline of the functional blocks of the calculation apparatus 80.

(Processing for Obtaining Sample Image Area from Thumbnail Image)

Figure 3:
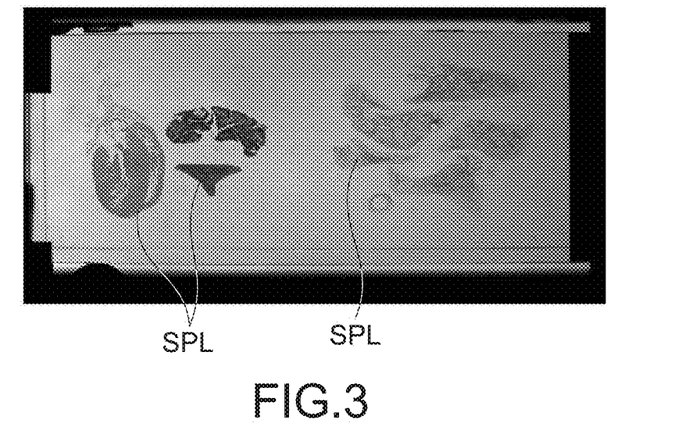
FIG. 3 is a diagram showing an example of a thumbnail image obtained by performing macro-photographing on an entire slide 10 of a pathological sample.
Figure 4:
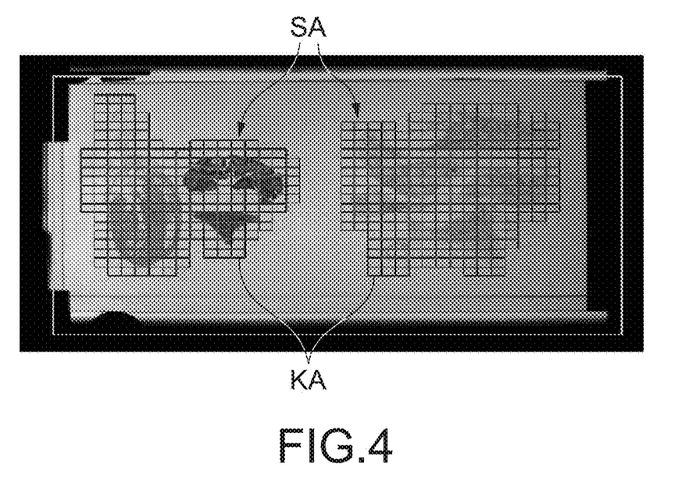
FIG. 4 is a diagram showing an example in which a set of sectional areas judged to be including an image of a pathological sample are extracted as a sample image area on the thumbnail image.

Next, referring to FIGS. 3 and 4, an outline of the processing for obtaining a sample image area from a thumbnail image obtained by the macro-photographing using the macro-camera 50 will be described. FIG. 3 is a diagram showing an example of a thumbnail image obtained by performing macro-photographing on the entire slide 10 of a pathological sample. FIG. 4 is a diagram showing an example in which a set of sectional areas judged to be including an image of a pathological sample are extracted as a sample image area on the thumbnail image.

The reason for obtaining a sample image area from a thumbnail image is to optimize a photographing time for the microscopic photographing by limiting the range to be microscopically photographed on the thumbnail image and, by limiting the photographing range, reduce a data amount of image data obtained by the microscopic photographing by not performing microscopic photographing on the sectional area not including the pathological sample.

First, the thumbnail acquisition unit 81 acquires a thumbnail image from the storage apparatus 70. In the example of the thumbnail image shown in FIG. 3, sections SPL obtained by staining a pathological sample of an animal are shown on the left-hand side, slightly left from the center, and the right half of the image.

Next, the image judgment unit 82 sections the entire thumbnail image into sectional areas. The size of the sectional areas is determined based on the size of the range to be microscopically photographed by the main camera 90 at one time. It should be noted that since a marginal portion for attaching (stitching) a plurality of images obtained by the microscopic photographing after microscopically photographing the slide 10 is provided in the actual microscopic photographing, the range to be microscopically photographed at one time and the range determined by the sectional areas do not completely match. Subsequently, the image judgment unit 82 judges whether each of the sectioned sectional areas includes an image of the pathological sample. This judgment uses a luminance value or an edge component index value as in Patent Document 2 as described above.

Finally, the sample image area judgment unit 83 extracts only the sectional areas judged to be including an image of the pathological sample and sets the areas as the sample image area. In the example shown in FIG. 4, the range of the image of the pathological sample is covered by a plurality of sectional areas KA each a horizontally-long rectangle and extracted as sample image areas SA.

It should be noted that in this example, all of the rectangular areas including the image of the pathological sample are extracted, and there is no detection leakage of the sectional areas including the pathological sample.

The descriptions above is the outline of the processing for obtaining a sample image area from a thumbnail image.

(Type of Slide in which Detection Leakage is Apt to Occur and Cause Thereof)

Next, a type of slide in which a detection leakage of a sectional area including a pathological sample is apt to occur and a cause thereof will be described.

There are roughly the following 3 types of slides in which a detection leakage is apt to occur.

The first type of slide is a slide in which a fat cell is a pathological sample. In a case where the fat cell does not include a cell nucleus, only a low-contrast image is photographed in the thumbnail image obtained by the macro-photographing, and thus an image tends to be left undetected.

Figure 5:
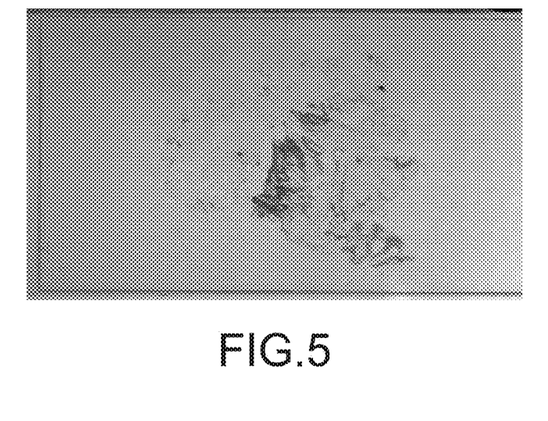
FIG. 5 is an example of a thumbnail image of a fat cell.

FIG. 5 is an example of the thumbnail image of a fat cell. At the center of the image, cells having a cell nucleus are aggregated, and thus a contrast of the image and the background is high. On the other hand, since the fat cells widely scattered in the periphery have no cell nucleus, the contrast of the image and the background is extremely low.

The next type of slide is a lightly-stained slide. Particularly when the slide is stained in blue, a detection leakage is apt to occur when short-wavelength light is used for the illumination.

Figure 6:
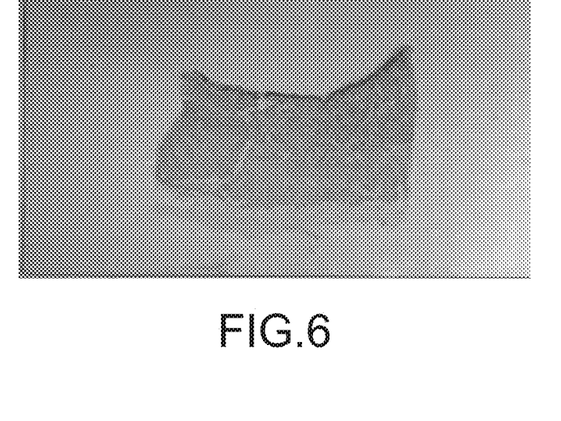
FIG. 6 is an example of a thumbnail image of a slide having a light stain.

FIG. 6 is an example of a thumbnail image of a lightly-stained slide.

Since the stain is light, the contrast of the image and the background is extremely low.

The third type of slide is a slide in which an image of a pathological sample is extremely small. Since the image of a pathological sample is extremely small, it is difficult to distinguish the image from dusts and noises captured in the thumbnail image, with the result that a detection leakage is apt to occur. In this type of slide, it is possible to lower a threshold value used for judging whether there is an image for reducing a detection leakage (raising detection sensitivity), but in such a case, most of the dusts and noises are erroneously detected as an image of the pathological sample, which is not practical.

Figure 7:
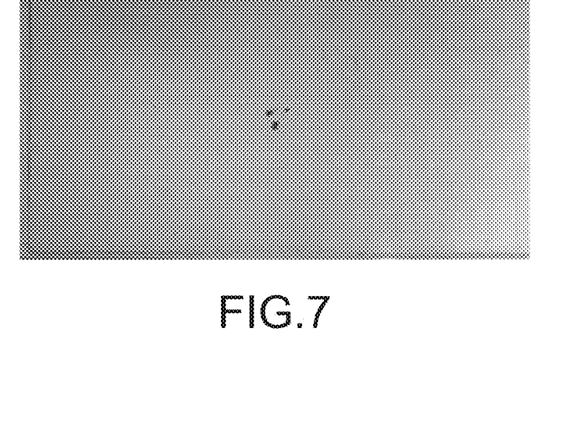
FIG. 7 is an example of a thumbnail image including an extremely-small image of a pathological sample.

FIG. 7 is an example of a thumbnail image including an extremely-small image of a pathological sample. It can be seen that a sample is captured as minute dots at the center of the image.

The descriptions above have been given on the type of slide in which a detection leakage is apt to occur and the cause thereof.

(Method of Judging Slide in which Detection Leakage is Apt to Occur)

Next, a method of judging a slide in which a detection leakage is apt to occur will be described. It should be noted that the judgment processing is carried out by the area expansion unit 84.

As described above, it has been found that, in a slide in which a detection leakage is apt to occur, a contrast of an image of a pathological sample and background in a thumbnail image is extremely low or an image of a pathological sample captured in a thumbnail image is extremely small. In this regard, for the slide judgment, the following two indices can be used, for example.

First, for judging whether an image of a pathological sample is of a low contrast in a thumbnail image, it is possible to use a comparison between a luminance value of the sectional areas judged as not including an image of the pathological sample and a luminance mean value of the sectional areas judged as including the image of the pathological sample, that is, the sample image area, the numerical expression of which is as follows.

$$C = L_{blank} - (1/N)\Sigma 1(x,y)$$

$L_{blank}$ represents a luminance value of the sectional areas judged as not including the image of the pathological sample, N represents the number of pixels included in the sample image area, $1(x, y)$ represents a luminance value of a pixel at coordinates $(x, y)$ in the sample image area, and $(1/N)\Sigma 1(x, y)$ represents a luminance mean value of the sample image area.

The value C is a value obtained by subtracting the luminance mean value of the sample image area from the luminance value of the sectional area judged as not including the image of the pathological sample and normally takes a positive value. The contrast becomes higher as the value increases, and the contrast becomes lower as the value decreases.

Next, for judging whether an image of a pathological sample captured in a thumbnail image is extremely small, the number of sectional areas judged as including an image of a pathological sample can be used, the numerical expression of which is as follows.

$$n < N_{Th}$$

n represents the number of sectional areas judged as including an image of a pathological sample, and $N_{Th}$ represents a threshold value of the number of sectional areas used for judging whether the image of the pathological sample captured in the thumbnail image is extremely small.

Heretofore, the method of judging a slide in which a detection leakage is apt to occur has been described.

(Expansion Processing)

Next, expansion processing carried out for compensating for a detection leakage (lowering detection leakage ratio) in which it is judged that an image of a pathological sample is not included even though there actually is an image of a pathological sample in a sectional area will be described. It should be noted that which expansion processing is to be carried out in what case will also be described.

In the descriptions above, the 4 types of processing including the outer circumferential expansion processing, the rectangular expansion processing, the closed area processing, and the entire area designation processing have been taken as an example of the expansion processing. The four types are of course merely an example, and the expansion processing is not limited to those methods. Here, details of the expansion processing will be described.

It should be noted that the expansion processing is for lowering the detection leakage ratio by also setting, as the photographing area, the sectional area in which an image of a pathological sample cannot be detected even when the detection sensitivity is raised, that is, the sectional area that is not judged as including an image of a pathological sample.

(Outer Circumferential Expansion Processing)

Figure 8:
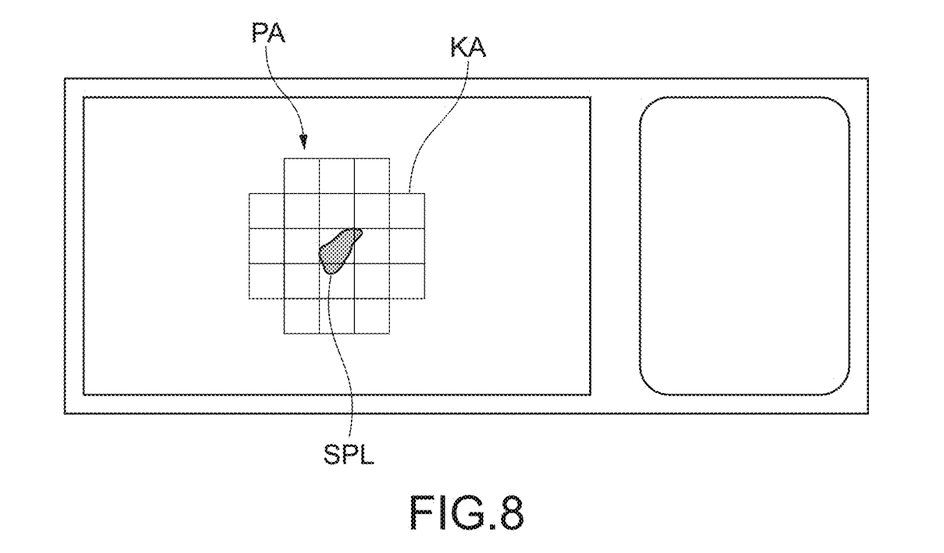
FIG. 8 is a diagram showing an example of outer circumferential expansion processing.

The outer circumferential expansion processing is expansion processing carried out by the area expansion unit 84 when a thumbnail image is a low-contrast image and an image of a pathological sample is extremely small. In this expansion processing, a sample image area is expanded by an amount corresponding to several sectional areas in the outer circumferential direction in a sectional area unit. The reason why such an expansion is carried out is because from experience, it is known that a tissue fragment highly likely exists in the periphery of a minute sample.

FIG. 8 is a diagram showing an example of the outer circumferential expansion processing, and a photographing area PA is expanded to the periphery of a sample image area constituted of the sectional areas KA including an image of a pathological sample SPL.

(Rectangular Expansion Processing)

Figure 9:
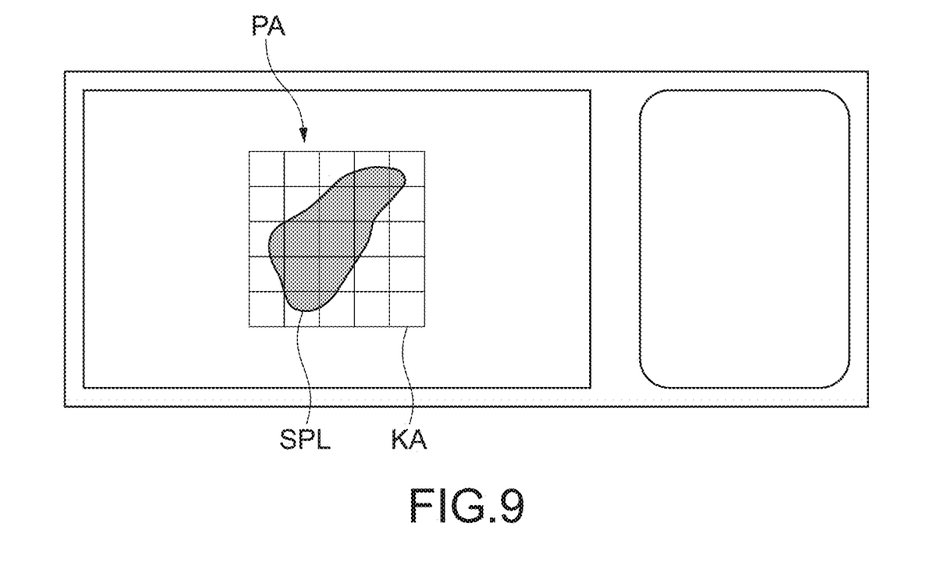
FIG. 9 is a diagram showing an example of rectangular expansion processing.

The rectangular expansion processing is expansion processing carried out by the area expansion unit 84 when a thumbnail image is a low-contrast image and an image of a pathological sample is not minute. Normally, a shape of a sample image area conforms to the shape of the pathological sample. However, in this expansion processing, the sample image area is expanded to a rectangular area including the sample image area.

As a length of the rectangular area in the lateral direction, a maximum value of the sectional areas arranged in the lateral direction of the sample image area is used. Moreover, as the length of the rectangular area in the longitudinal direction, a maximum value of the sectional areas arranged in the longitudinal direction of the sample image area is used.

This expansion is effective for incorporating a sectional area that has not been detected but highly likely includes an image of a pathological sample into the photographing area and is effectively used on a slide that has undergone special staining or a slide of a fat cell.

FIG. 9 is a diagram showing an example of the rectangular expansion processing, and the photographing area PA is generated by expanding the sample image area including the image of the pathological sample SPL to a rectangular area.

(Closed Area Processing)

Figure 10:
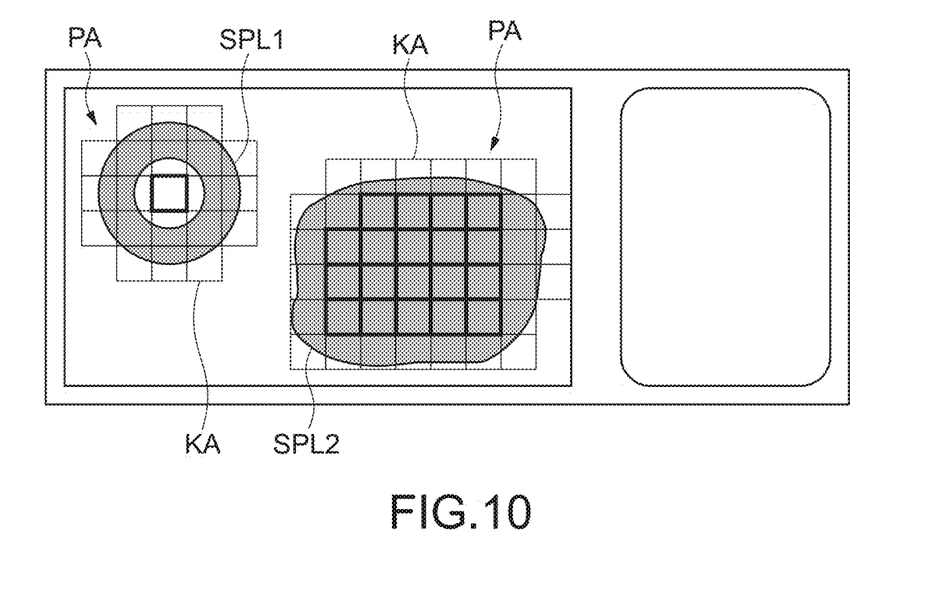
FIG. 10 is a diagram showing an example of closed area processing.

The closed area processing is expansion processing carried out by the area expansion unit 84 when there is a sectional area judged as not including an image of a pathological sample inside the sample image area. In this expansion processing, the sectional area judged as not including an image of a pathological sample inside the sample image area is added to the sample image area for an expansion. This is because from experience, it is known that fat cells are highly likely scattered in an area surrounded by the pathological sample.

FIG. 10 is a diagram showing an example of the closed area processing. In an image of a pathological sample SPL1 shown on the left-hand side of the figure, since a sectional area judged as not including an image of a pathological sample is present at the center of the sample image area, the sectional area is added to the photographing area PA. Moreover, while fat cells are thinly scattered inside an image of a pathological sample SPL2 shown on the right-hand side of the figure, sectional areas including the fat cells were not detected in the judgment on whether there is an image of a pathological sample. However, since the sectional areas are surrounded by the sample image area, the sectional areas are added to the photographing area PA.

(Entire Area Designation Processing)

The entire area designation processing is expansion processing carried out by the entire area designation unit 86 when there is no sectional area at all that is judged as including an image of a pathological sample by the sample image area judgment unit 83. In this expansion processing, even when there is no sectional area judged as including an image of a pathological sample at all, all areas possibly including the sample are set as the photographing area for safety.

Heretofore, the details of the expansion processing have been described.

(Cautions in Attaching Microscopically-Photographed Images by Expansion Processing)

Next, cautions in attaching microscopically-photographed images by the expansion processing will be described.

In the digital microscope apparatus 1, photographing areas generated by the area expansion unit 84 or the entire area designation unit 86 are microscopically photographed one by one by the microscopic photographing unit 85 in an order determined by a photographing map to thus obtain a plurality of images. The obtained images are subjected to attachment (stitching) processing in the same order as the photographing order determined by the photographing map. In the attachment processing, the two images to be attached need to include marginal portions obtained by photographing the same marginal range. The two images are attached such that images in the images included in the same marginal ranges coincide.

As described above, in the digital microscope apparatus 1 of this embodiment, a sectional area in which an image of a pathological sample has not been detected may also be microscopically photographed due to the expansion processing. Therefore, an attachment of images of the sectional areas whose images have not been detected needs to be carried out carefully since there is a high possibility that there is no image to be used for positioning for the attachment in the marginal portions.

Here, an attachment failure example will be described first, and then an appropriate attachment example will be described after that.

Figure 11:
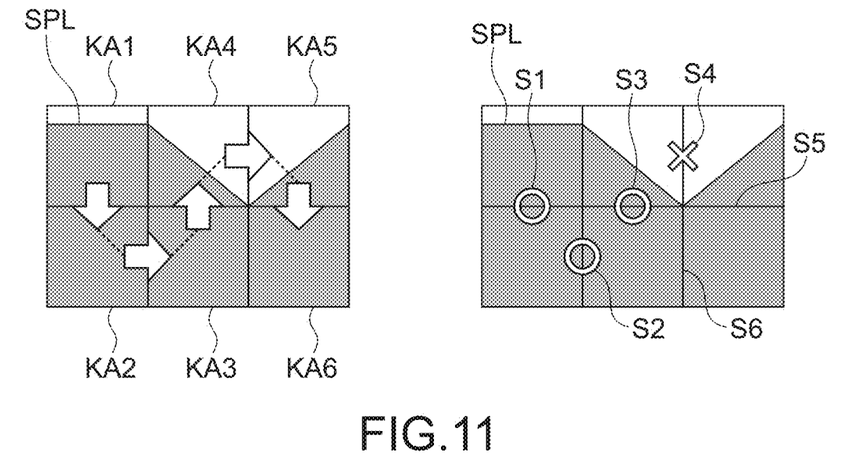
FIG. 11 is a diagram showing an order of microscopic photographing and a state of an attachment portion in a case where an attachment ends in a failure.

FIG. 11 is a diagram showing an order of the microscopic photographing and a state of an attachment portion in a case where an attachment ends in a failure. It should be noted that the diagram on the right-hand side and the diagram on the left-hand side indicate the same portion on a thumbnail image, and symbols of the sectional areas are also the same.

The diagram showing the order of the microscopic photographing is shown on the left-hand side of FIG. 11. In the diagram, the sectional areas judged to be including an image of a pathological sample are the sectional areas KA2, KA3, and KA6 shown on the lower side of the diagram, and the sectional areas set as the photographing area by the expansion processing are the sectional areas KA1, KA4, and KA5 shown on the upper side of the diagram. The microscopic photographing is performed in the stated order of the sectional areas KA1, KA2, KA3, KA4, KA5, and KA6 as indicated by the arrows in the diagram.

The diagram showing positions of the marginal portions for attaching microscopically-photographed images is shown on the right-hand side of FIG. 11. First, according to the order of the microscopic photographing, an image of the sectional area KA1 and an image of the sectional area KA2 are attached at a margin S1. Since the margin S1 is a portion including an image of the pathological sample SPL, the images can be attached with high accuracy. Next, the image of the sectional area KA2 and an image of the sectional area KA3 are attached at a margin S2. This attachment can also be performed with high accuracy. The same holds true for the subsequent margin S3.

However, a margin S4 at which an image of the sectional area KA4 and an image of the sectional area KA5 are to be attached is positioned at a portion where there is no image of the pathological sample SPL, and thus the attachment accuracy is lowered. Therefore, in the attachment of the sectional area KA6 subsequent to that attachment, an attachment deviation highly likely occurs at the margins S5 and S6.

Figure 12:
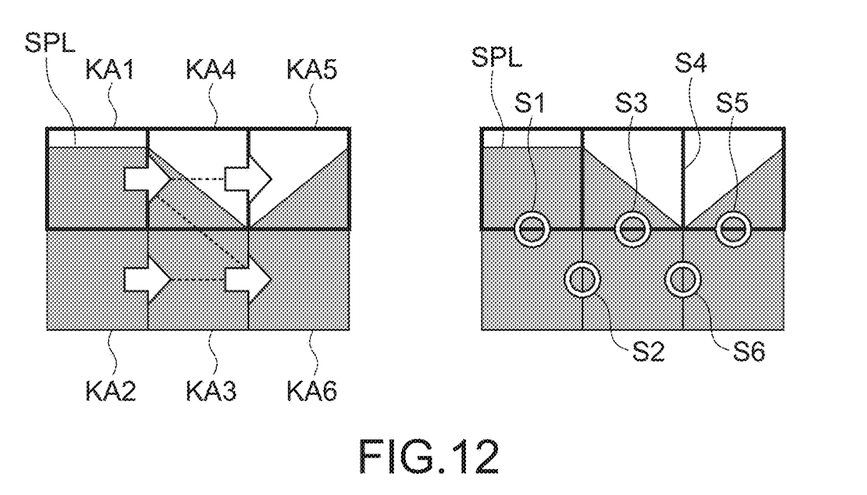
FIG. 12 is a diagram showing the order of microscopic photographing and a state of the attachment portion in a case where an attachment is performed appropriately.

FIG. 12 is a diagram showing the order of microscopic photographing and a state of the attachment portion in a case where an attachment is performed appropriately. It should be noted that the diagram on the right-hand side and the diagram on the left-hand side indicate the same portion on a thumbnail image, and symbols of the sectional areas are also the same.

The diagram showing the order of the microscopic photographing is shown on the left-hand side of FIG. 12. The microscopic photographing is performed in the stated order of the sectional areas KA2, KA3, KA6, KA1, KA4, KA5 as indicated by the arrows in the diagram. In other words, after microscopically photographing the sectional areas originally included in the sample image area, the sectional areas set as the photographing area by the expansion processing are photographed. As a result, as shown on the right-hand side of FIG. 12, the attachments are performed in the stated order of the margins S2, S6, S1, S3, and S5, and the margin S4 inappropriate for the attachment is not used. Therefore, the attachment processing is carried out appropriately until the end.

In microscopically photographing the photographing area, the order of the microscopic photographing needs to be determined so as to use a margin at an appropriate position as described above.

Heretofore, the cautions for attaching microscopically-photographed images by the expansion processing have been described.

(Flow of Processing of Area Expansion and Microscopic Photographing)

Figure 13:
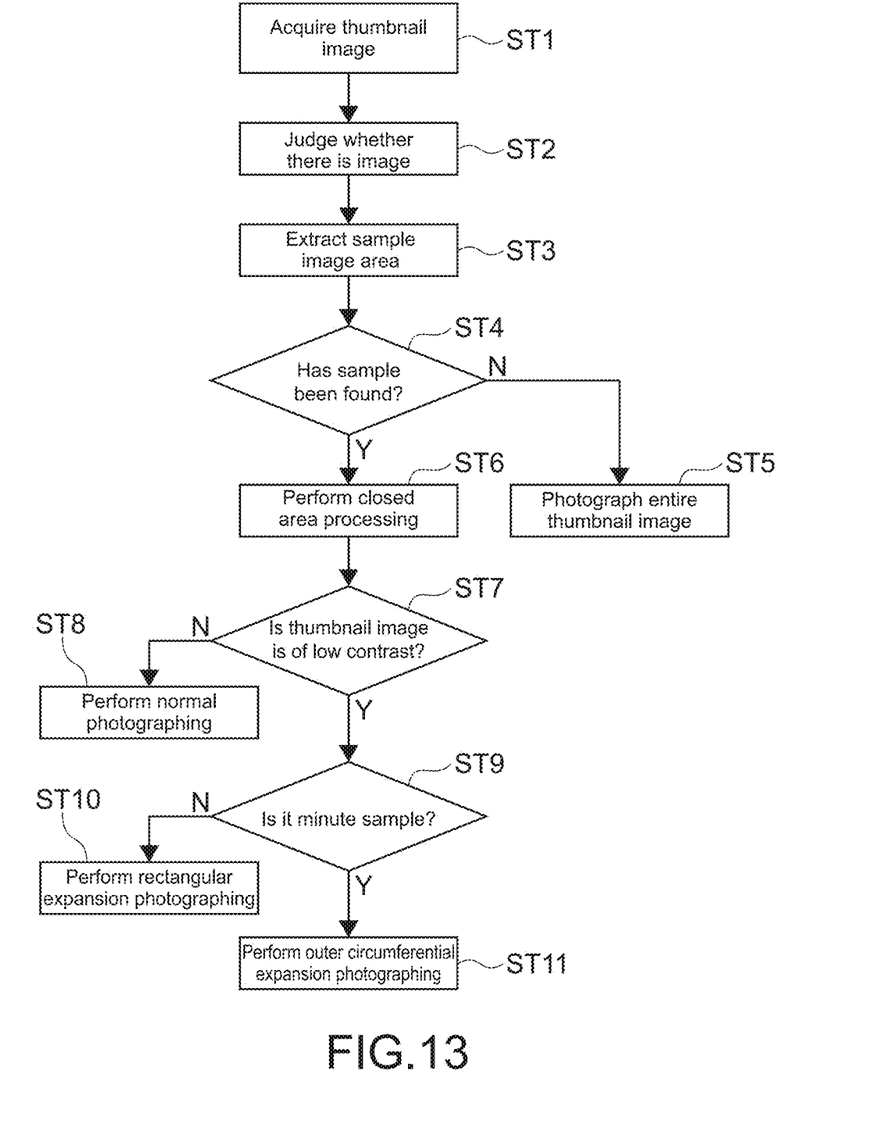
FIG. 13 is a flowchart for explaining a flow of processing of an area expansion and microscopic photographing.

Next, a flow of processing of the area expansion and microscopic photographing will be described. FIG. 13 is a flowchart for explaining the flow of the processing of the area expansion and microscopic photographing.

First, the thumbnail acquisition unit 81 transmits an instruction to the macro-camera 50 via the image capture apparatus 60 to perform macro-photographing of the slide 10. Further, the thumbnail acquisition unit 81 acquires a thumbnail image from the storage apparatus 70 (Step ST1).

Next, the image judgment unit 82 judges whether an image of a pathological sample is in each of the sectional areas (Step ST2).

Then, the sample image area judgment unit 83 extracts, as a sample image area, a set of the sectional areas judged as including the image of the pathological sample (Step ST3).

Subsequently, the entire area designation unit 86 judges whether there is a sectional area judged as including the image of the pathological sample (Step ST4).

When there is no sectional area judged as including the image of the pathological sample (N in Step ST4), the entire area designation unit 86 designates the entire thumbnail image as the photographing area, and the microscopic photographing unit 85 photographs the photographing area using the main camera 90. Then, the processing ends (Step ST5).

When there is a sectional area judged as including the image of the pathological sample (Y in Step ST4), the area expansion unit 84 carries out the closed area processing (Step ST6). In the closed area processing, when there is a sectional area judged as not including the image of the pathological sample inside the sample image area, the processing of adding the sectional area to the sample image area is carried out.

Next, the area expansion unit 84 judges whether the thumbnail image as the processing target is of a low contrast (Step ST7). The judgment criteria are as described above.

When the thumbnail image is not of a low contrast (N in Step ST7), the area expansion unit 84 does not carry out the area expansion processing anymore and hands over the current photographing area as it is to the microscopic photographing unit 85 so that the microscopic photographing unit 85 photographs the photographing area using the main camera 90 and ends the processing (Step ST8).

When the thumbnail image is of a low contrast (Y in Step ST7), the area expansion unit 84 next judges whether the image of the pathological sample in the thumbnail image as the processing target is a minute sample (Step ST9).

When the image of the pathological sample in the thumbnail image is not a minute sample (N in Step ST9), the area expansion unit 84 designates the photographing area obtained by expanding it by the rectangular expansion processing, and the microscopic photographing unit 85 photographs the photographing area using the main camera 90 and ends the processing (Step ST10).

When the image of the pathological sample in the thumbnail image is a minute sample (Y in Step ST9), the area expansion unit 84 designates the photographing area obtained by expanding it by the outer circumferential expansion processing, and the microscopic photographing unit 85 photographs the photographing area using the main camera 90 and ends the processing (Step ST11).

Heretofore, the flow of the processing of the area expansion and microscopic photographing has been described.

(Flow of Processing of Area Expansion and Microscopic Photographing (Modified Example))

Figure 14:
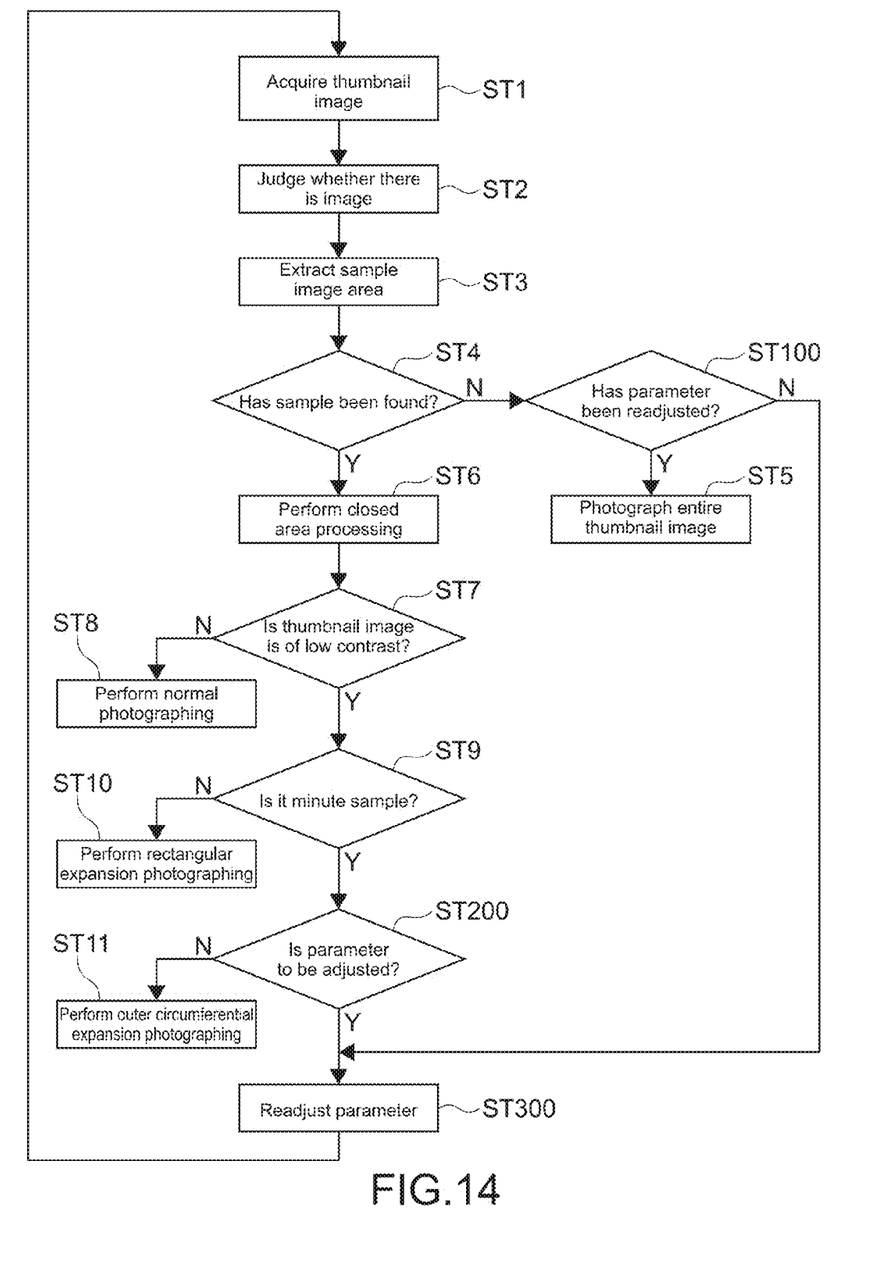
FIG. 14 is a flowchart for explaining a modified example of the flow of processing of the area expansion and microscopic photographing.

Next, a modified example of the flow of the processing of the area expansion and microscopic photographing will be described. FIG. 14 is a flowchart for explaining the modified example of the flow of the processing of the area expansion and microscopic photographing.

A large difference between the flow of the area expansion and microscopic photographing processing to be described herein and the flow of the processing described above is that, in the modified example, after adjusting a parameter used for judging whether there is an image of a pathological sample, the processing from the judgment to the expansion processing is carried out again. By readjusting the parameter, a detection leakage ratio is to be lowered.

It should be noted that the parameter used herein includes a software parameter and a hardware parameter. Although details will be given later, a threshold value used in judging whether there is an image of a pathological sample in each sectional area by the image judgment unit 82 is an example of the parameter. The parameter is adjusted so as to raise the detection sensitivity of an image.

First, the thumbnail acquisition unit 81 transmits an instruction to the macro-camera 50 via the image capture apparatus 60 to perform macro-photographing of the slide 10. Further, the thumbnail acquisition unit 81 acquires a thumbnail image from the storage apparatus 70 (Step ST1).

Next, the image judgment unit 82 judges whether an image of a pathological sample is in each of the sectional areas (Step ST2).

Then, the sample image area judgment unit 83 extracts, as a sample image area, a set of the sectional areas judged as including the image of the pathological sample (Step ST3).

Subsequently, the entire area designation unit 86 judges whether there is a sectional area judged as including the image of the pathological sample (Step ST4).

When there is no sectional area judged as including the image of the pathological sample (N in Step ST4), the entire area designation unit 86 next judges whether a parameter readjustment has already been performed (Step ST100).

When the parameter readjustment has already been performed (Y in Step ST100), the entire area designation unit 86 designates the entire thumbnail image as the photographing area, and the microscopic photographing unit 85 photographs the photographing area using the main camera 90 and ends the processing (Step ST5).

When the parameter readjustment has not been performed (N in Step ST100), the processing advances to Step ST300 for performing the parameter readjustment.

When there is a sectional area judged as including the image of the pathological sample (Y in Step ST4), the area expansion unit 84 carries out the closed area processing (Step ST6).

Next, the area expansion unit 84 judges whether the thumbnail image as the processing target is of a low contrast (Step ST7).

When the thumbnail image is not of a low contrast (N in Step ST7), the area expansion unit 84 does not carry out the area expansion processing anymore and hands over the current photographing area as it is to the microscopic photographing unit 85 so that the microscopic photographing unit 85 photographs the photographing area using the main camera 90 and ends the processing (Step ST8).

When the thumbnail image is of a low contrast (Y in Step ST7), the area expansion unit 84 next judges whether the image of the pathological sample in the thumbnail image as the processing target is a minute sample (Step ST9).

When the image of the pathological sample in the thumbnail image is not a minute sample (N in Step ST9), the area expansion unit 84 designates the photographing area obtained by expanding it by the rectangular expansion processing, and the microscopic photographing unit 85 photographs the photographing area using the main camera 90 and ends the processing (Step ST10).

When the image of the pathological sample in the thumbnail image is a minute sample (Y in Step ST9), the area expansion unit 84 judges whether to perform the parameter readjustment (Step ST200).

When the parameter readjustment is not to be performed (N in Step ST200), the area expansion unit 84 designates the photographing area obtained by expanding it by the outer circumferential expansion processing, and the microscopic photographing unit 85 photographs the photographing area using the main camera 90 and ends the processing (Step ST11).

When the parameter readjustment is to be performed (Y in Step ST200), the image judgment unit 82 readjusts the parameter for detecting an image (Step ST300). After the parameter readjustment, the processing returns to Step ST1, and the processing is repeated.

It should be noted that the processing needs to be repeated carefully so as not to raise the detection sensitivity too much. When the sensitivity is raised too much, influences of noises, dusts, and the like become large, and an excessive detection tends to occur. When an excessive detection tends to occur, unnecessary sectional areas are microscopically photographed that much, and thus time required for the photographing increases. Therefore, the parameter readjustment needs to be performed while taking influences of noises into consideration.

Heretofore, the modified example of the flow of the processing of the area expansion and microscopic photographing has been described.

(Parameters to be Readjusted)

Next, an example of the parameters to be readjusted in the flow of the modified example described above will be described. It should be noted that the parameters affect the result of the judgment processing on whether an image of a pathological sample is included in a sectional area, that is carried out by the image judgment unit 82.

First, in the judgment processing on whether an image of a pathological sample is included in a sectional area, that is carried out by the image judgment unit 82, a threshold value to be compared with a luminance value or an edge component index value, such as a standard deviation, becomes the parameter. By lowering the threshold value, that is, alleviating the judgment criteria, the sensitivity can be raised.

Next, in the macro-photographing processing carried out by the thumbnail acquisition unit 81, an illumination intensity or an exposure time becomes the parameter. By changing the exposure time (light amount), the luminance value of the thumbnail image can be kept within an appropriate range.

Next, in the development processing also carried out by the thumbnail acquisition unit 81, a dynamic range becomes the parameter. The development processing may be carried out by changing the dynamic range.

In addition, in the preprocessing of the development, a parameter for unsharp mask processing may be used.

Heretofore, the examples of the parameters to be readjusted have been described.

(Effect of Present Disclosure)

According to the present disclosure, the detection leakage ratio can be lowered while suppressing the processing time required for acquiring a pathological image from the slide 10. In addition, a robust property (stability) of photographing by the digital microscope apparatus 1 can be improved.

It should be understood by those skilled in the art that various modifications, combinations, sub-combinations and alterations may occur depending on design requirements and other factors insofar as they are within the scope of the appended claims or the equivalents thereof.

What is claimed is:

1. An image acquisition apparatus, comprising:
    a macro-photographing unit configured to perform macro-photographing of a pathological sample mounted on a sample mounting area of a slide at a first magnification to obtain an image of the pathological sample;
    a first judgment unit that makes a first judgment of whether any of a plurality of sectional areas sectioning the image of the pathological sample comprise at least a portion of the image of the pathological sample; and
    a second judgment unit that makes a second judgment to determine an image area to expand based on a parameter;
    a microscopic photographing unit configured to microscopically photograph a designated photographing area at a second magnification that is larger than the first magnification; and
    an area expansion unit configured to generate an expanded area having a size of at least one of the plurality of the sectional areas by expanding the at least one of the plurality of sectional areas, wherein the size is based on the second judgment and the first judgment of whether the any of the plurality of sectional areas comprise at least the portion of the image of the pathological sample, and cause the microscopic photographing unit to photograph the expanded area,
    wherein the area expansion unit generates the expanded area by expanding the image area when the parameter is a difference between a luminance value of the image area and a luminance value of the sectional areas judged as not comprising at least the portion of the image of the pathological sample that is smaller than a first threshold value,
    wherein the area expansion unit generates the expanded area by expanding the image area in an outer circumferential direction in a unit of the sectional areas when a number of sectional areas included in the image area is smaller than a predetermined second threshold value
    wherein the area expansion unit generates the expanded area by expanding the image area in a rectangular area including the image area when a number of sectional areas included in the image area is equal to or larger than the predetermined second threshold value, and
    wherein the rectangular area has a maximum value of a number of sectional areas included in the image area in a longitudinal direction being the number of sectional areas arranged in the longitudinal direction of the rectangular area and a maximum value of a number of sectional areas included in the image area in a lateral direction being the number of sectional areas arranged in the lateral direction of the rectangular area.

2. The image acquisition apparatus according to claim 1, wherein the area expansion unit generates, when there is a sectional area judged as not comprising at least the portion of the image of the pathological sample in the image area, the expanded area by adding the sectional area to the image area.

3. The image acquisition apparatus according to claim 1, further comprising:
    an entire area designation unit configured to cause, when there is no sectional area judged to comprise at least the portion of the image of the pathological sample, the microscopic photographing unit to photograph the entire sample mounting area based on the judgment of no sectional areas comprising the at least the portion of the image of the pathological sample.

4. The image acquisition apparatus according to claim 1, wherein the first judgment unit adjusts a primary parameter for judging whether there is the at least the portion of the image of the pathological sample and performs the judgment again when the difference between the luminance value of the image area and the luminance value of the sectional area judged as not comprising at least the portion of the image of the pathological sample is smaller than the first threshold value and the number of sectional areas included in the image area is smaller than the second threshold value.

5. An image acquisition method, comprising:
    performing, by a macro-photographing unit, macro-photographing of a pathological sample mounted on a sample mounting area of a slide at a first magnification;
    judging a first judgment, by a first judgment unit, whether any of a plurality of sectional areas sectioning an image of the pathological sample comprise at least a portion of the image of the pathological sample; and
    judging a second judgment, by a second judgment unit, to determine an image area to expand based on a parameter;
    generating, by an area expansion unit, an expanded area having a size of at least one of the plurality of the sectional areas by expanding the at least one of the plurality of sectional areas, wherein the size is based on the second judgment and the first judgment of whether the any of the plurality of sectional areas comprise at least the portion of the image of the pathological sample; and
    microscopically photographing, by a microscopic photographing unit, the generated expanded area at a second magnification larger than the first magnification,
    wherein the area expansion unit generates the expanded area by expanding the image area when the parameter is a difference between a luminance value of the image area and a luminance value of the sectional areas judged as not comprising at least the portion of the image of the pathological sample that is smaller than a first threshold value,
    wherein the area expansion unit generates the expanded area by expanding the image area in an outer circumferential direction in a unit of the sectional areas when a number of sectional areas included in the image area is smaller than a predetermined second threshold value,
    wherein the area expansion unit generates the expanded area by expanding the image area in a rectangular area including the image area when a number of sectional areas included in the image area is equal to or larger than the predetermined second threshold value, and
    wherein the rectangular area has a maximum value of a number of sectional areas included in the image area in a longitudinal direction being the number of sectional areas arranged in the longitudinal direction of the rectangular area and a maximum value of a number of sectional areas included in the image area in a lateral direction being the number of sectional areas arranged in the lateral direction of the rectangular area.

6. An information processing program, comprising:

a first judgment unit that makes a first judgment of whether any of a plurality of sectional areas sectioning an image of a pathological sample mounted on a sample mounting area of a slide obtained by causing a macro-photographing unit to perform macro-photographing of the image at a first magnification, comprises at least a portion of the image of the pathological sample; and a second judgment unit that makes a second judgment to determine an image area to expand based on a parameter; and an area expansion unit configured to generate an expanded area having a size of at least one of the plurality of the sectional areas by expanding the at least one of the plurality of the sectional areas, wherein the size is based on the second judgment and the first judgment of whether the any of the plurality of the sectional areas comprise at least the portion of the image of the pathological sample, and cause a microscopic photographing unit to microscopically photograph the expanded area at a second magnification larger than the first magnification wherein the area expansion unit generates the expanded area by expanding the image area when the parameter is a difference between a luminance value of the image area and a luminance value of the sectional areas judged as not comprising at least the portion of the image of the pathological sample that is smaller than a first threshold value, wherein the area expansion unit generates the expanded area by expanding the image area in an outer circumferential direction in a unit of the sectional areas when a number of sectional areas included in the image area is smaller than a predetermined second threshold value wherein the area expansion unit generates the expanded area by expanding the image area in a rectangular area including the image area when a number of sectional areas included in the image area is equal to or larger than the predetermined second threshold value, and wherein the rectangular area has a maximum value of a number of sectional areas included in the image area in a longitudinal direction being the number of sectional areas arranged in the longitudinal direction of the rectangular area and a maximum value of a number of sectional areas included in the image area in a lateral direction being the number of sectional areas arranged in the lateral direction of the rectangular area.

7. The image acquisition apparatus according to claim 1, wherein a detection leakage is present in the image of the pathological sample in a portion of at least one of the sectional areas sectioning the image of the pathological sample that was not judged to comprise at least the portion of the image of the pathological sample by the first judgment unit, and wherein the detection leakage is in the image area to expand based on the parameter judged by the second judgment unit.

8. The image acquisition method according to claim 5, wherein the area expansion unit generates, when there is a sectional area judged as not comprising at least the portion of the image of the pathological sample in the image area, the expanded area by adding the sectional area to the image area.

9. The image acquisition method according to claim 5, further comprising:

an entire area designation unit configured to cause, when there is no sectional area judged to comprise at least the portion of the image of the pathological sample, the microscopic photographing unit to photograph the entire sample mounting area based on the judgment of no sectional areas comprising the at least the portion of the image of the pathological sample.

10. The image acquisition method according to claim 5, wherein the first judgment unit adjusts a primary parameter for judging whether there is the at least the portion of the image of the pathological sample and performs the judgment again when the difference between the luminance value of the image area and the luminance value of the sectional area judged as not comprising at least the portion of the image of the pathological sample is smaller than the first threshold value and the number of sectional areas included in the image area is smaller than the second threshold value.

11. The image acquisition method according to claim 5, wherein a detection leakage is present in the image of the pathological sample in a portion of at least one of the sectional areas sectioning the image of the pathological sample that was not judged to comprise at least the portion of the image of the pathological sample by the first judgment unit, and wherein the detection leakage is in the image area to expand based on the parameter judged by the second judgment unit.

12. The image acquisition apparatus according to claim 1, wherein the parameter is a predetermined contrast of an image and a background of a thumbnail image.

* * * * *